US011822736B1

(12) United States Patent
Shin et al.

(10) Patent No.: US 11,822,736 B1
(45) Date of Patent: Nov. 21, 2023

(54) PASSIVE-ACCESSORY MEDIATED GESTURE INTERACTION WITH A HEAD-MOUNTED DEVICE (71) Applicant: Google LLC, Mountain View, CA (US)

(72) Inventors: Dongeek Shin, Santa Clara, CA (US); Ricardo John Campbell, Redwood City, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/663,978

(22) Filed: May 18, 2022

(51) Int. Cl.
G06F 3/0346 (2013.01)
G06F 3/01 (2006.01)

(52) U.S. Cl.
CPC .......... *G06F 3/0346* (2013.01); *G06F 3/012* (2013.01); *G06F 3/017* (2013.01); *G06F 2203/0331* (2013.01)

(58) Field of Classification Search
CPC ........ G06F 3/0346; G06F 3/012; G06F 3/017; G06F 2203/0331
See application file for complete search history.

(56) References Cited

U.S. PATENT DOCUMENTS

| 7,301,648 | B2 * | 11/2007 | Foxlin | G02B 27/017 356/620 |
| 8,878,749 | B1 * | 11/2014 | Wu | G09G 5/00 351/209 |
| 9,141,194 | B1 * | 9/2015 | Keyes | G06F 3/014 |
| 9,658,692 | B1 * | 5/2017 | Keyes | G01R 33/0029 |
| 9,996,162 | B2 * | 6/2018 | Kar | G10H 1/0555 |
| 10,078,377 | B2 * | 9/2018 | Balan | G06T 19/006 |
| 10,146,323 | B1 * | 12/2018 | Keyes | G06F 3/038 |
| 10,222,469 | B1 * | 3/2019 | Gillian | G06V 10/806 |
| 10,254,546 | B2 * | 4/2019 | Poulos | G02B 27/017 |
| 10,338,688 | B2 * | 7/2019 | Cho | G06F 3/0346 |
| 10,509,469 | B2 * | 12/2019 | Erivantcev | G06F 3/03547 |
| 10,551,929 | B2 * | 2/2020 | Kim | H04M 1/72415 |
| 10,628,711 | B2 * | 4/2020 | Balan | G06F 3/011 |
| 10,678,334 | B1 * | 6/2020 | Pezent | G06F 3/0346 |
| 11,003,246 | B2 * | 5/2021 | Pelis | G06F 3/038 |
| 11,016,116 | B2 * | 5/2021 | Erivantcev | G06F 18/00 |
| 11,048,325 | B2 * | 6/2021 | Ravindran | G06T 19/006 |

(Continued)

FOREIGN PATENT DOCUMENTS

EP 3739356 A1 11/2020

*Primary Examiner* — Benyam Ketema
(74) *Attorney, Agent, or Firm* — Brake Hughes Bellermann LLP (57) ABSTRACT

Physical gestures may be performed by a user to interact with a head-mounted device. These physical gestures can be detected by other devices worn by the user. For example, a fitness tracker worn on a wrist of a user may be used to detect the movement of the wrist as a gesture and then communicate this gesture to the head-mounted device. This accessory-mediated gesture interaction may be interrupted when the accessory device loses power or otherwise stops tracking. In this condition, the disclosed head-mounted device may take-over gesture detection by monitoring distortions to a magnetic field caused by movement of the device. This form of gesture detection can be used when an active device has exhausted its battery. Further, this form of gesture detection can be used for electrically inactive objects that can cause detectable changes to the magnetic field when moved in the magnetic field.

18 Claims, 8 Drawing Sheets

(56) References Cited

U.S. PATENT DOCUMENTS

| | | | |
|---|---|---|---|
| 11,067,644 B2* | 7/2021 | Maguire | G01R 33/0206 |
| 11,231,817 B2* | 1/2022 | Osterhout | G06F 3/044 |
| 11,275,453 B1* | 3/2022 | Tham | G06F 3/04842 |
| 11,301,128 B2* | 4/2022 | Adem | G06F 3/04883 |
| 11,402,871 B1* | 8/2022 | Berliner | G06F 3/021 |
| 11,474,593 B2* | 10/2022 | Erivantcev | G06F 3/017 |
| 11,546,505 B2* | 1/2023 | Canberk | H04N 13/332 |
| 11,586,048 B2* | 2/2023 | Osterhout | G02B 27/0176 |
| 2006/0256036 A1* | 11/2006 | Katano | H04N 13/239 |
| | | | 348/E13.041 |
| 2008/0169998 A1* | 7/2008 | Jacobsen | G02B 27/0172 |
| | | | 345/8 |
| 2010/0321383 A1* | 12/2010 | Nakamura | G06F 3/017 |
| | | | 345/419 |
| 2011/0190060 A1* | 8/2011 | Ketabdar | G06F 3/017 |
| | | | 463/37 |
| 2011/0213664 A1* | 9/2011 | Osterhout | G06F 3/013 |
| | | | 705/14.58 |
| 2012/0235885 A1* | 9/2012 | Miller | G06Q 30/02 |
| | | | 345/8 |
| 2012/0236025 A1* | 9/2012 | Jacobsen | G06F 3/013 |
| | | | 345/629 |
| 2012/0249417 A1* | 10/2012 | Cho | G06F 3/017 |
| | | | 345/156 |
| 2014/0198017 A1* | 7/2014 | Lamb | G02B 27/017 |
| | | | 345/8 |
| 2015/0168365 A1* | 6/2015 | Connor | G01N 33/02 |
| | | | 356/402 |
| 2015/0258431 A1* | 9/2015 | Stafford | A63F 13/212 |
| | | | 463/31 |
| 2016/0125705 A1* | 5/2016 | Hurtig | G06F 3/04883 |
| | | | 340/4.11 |
| 2016/0364010 A1* | 12/2016 | Amma | G06V 30/228 |
| 2017/0177089 A1* | 6/2017 | Kar | G06F 3/017 |
| 2017/0354883 A1* | 12/2017 | Benedetto | G06T 19/20 |
| 2017/0358141 A1* | 12/2017 | Stafford | G06T 11/60 |
| 2018/0001198 A1* | 1/2018 | Frappiea | G06F 3/011 |
| 2018/0004478 A1* | 1/2018 | Chen | G06F 3/1454 |
| 2018/0075659 A1* | 3/2018 | Browy | G06F 40/58 |
| 2018/0157045 A1* | 6/2018 | Davami | G02B 27/0172 |
| 2018/0276467 A1* | 9/2018 | Kaehler | G06V 40/19 |
| 2018/0292471 A1 | 10/2018 | Chen et al. | |
| 2018/0293802 A1* | 10/2018 | Hendricks | G09B 23/30 |
| 2018/0364811 A1* | 12/2018 | Kar | G10H 1/0008 |
| 2019/0011978 A1* | 1/2019 | Ravindran | G06T 19/006 |
| 2019/0058859 A1* | 2/2019 | Price | H04N 13/271 |
| 2019/0115916 A1* | 4/2019 | Yang | G06F 3/011 |
| 2019/0286224 A1* | 9/2019 | De Nardi | G06F 3/011 |
| 2019/0286232 A1* | 9/2019 | De Nardi | G06F 3/017 |
| 2020/0096575 A1 | 3/2020 | Woods et al. | |
| 2020/0129124 A1* | 4/2020 | Harvey | G02C 11/10 |
| 2020/0225758 A1* | 7/2020 | Tang | G06F 3/012 |
| 2020/0242342 A1* | 7/2020 | Cho | G06V 40/28 |
| 2020/0271450 A1* | 8/2020 | Gorur Sheshagiri | G06F 1/163 |
| 2020/0301513 A1* | 9/2020 | Mejia Cobo | G06F 3/011 |
| 2020/0311397 A1* | 10/2020 | Sawhney | G09B 5/02 |
| 2020/0334461 A1 | 10/2020 | Rabinovich et al. | |
| 2020/0409469 A1* | 12/2020 | Kannan | G06V 30/19173 |
| 2022/0014680 A1* | 1/2022 | Cotoros | G06F 3/1423 |
| 2022/0129081 A1* | 4/2022 | Lahoti | G06N 3/08 |
| 2022/0229534 A1* | 7/2022 | Terre | G06F 3/04815 |

* cited by examiner

PASSIVE-ACCESSORY MEDIATED GESTURE INTERACTION WITH A HEAD-MOUNTED DEVICE

FIELD OF THE DISCLOSURE

The present disclosure relates to gesture interaction with a head-mounted device and more specifically to gesture interaction that includes a passive accessory device.

BACKGROUND

A user may wear multiple computing devices to provide a computing environment that can enable an augmented reality experience. Interaction between the computing devices can enhance the augmented reality experience.

SUMMARY

In some aspects, the techniques described herein relate to a head-mounted device including: a magnetometer configured to detect changes to a magnetic field caused by a movement of an accessory, in a passive state, in a volume including the head-mounted device; and a processor configured by instructions to: activate a passive-accessory mode for gesture input; receive a signal from the magnetometer corresponding to the changes to the magnetic field; apply the signal to a filter to generate a filtered signal; apply the filtered signal to a neural network to generate a movement signal corresponding to the movement of an accessory; and classify the movement signal as a gesture.

In some aspects, the techniques described herein relate to a head-mounted device, wherein the accessory is a wrist-worn computing device.

In some aspects, the techniques described herein relate to a head-mounted device, wherein the processor is configured to: receive a trigger signal to activate the passive-accessory mode for gesture input when a battery level of the wrist-worn computing device is below a threshold.

In some aspects, the techniques described herein relate to a head-mounted device, wherein the trigger signal is received from a mobile phone monitoring the battery level of the wrist-worn computing device.

In some aspects, the techniques described herein relate to a head-mounted device, wherein the processor is configured to: receive a trigger signal to activate the passive-accessory mode for gesture input when the wrist-worn computing device is turned OFF.

In some aspects, the techniques described herein relate to a head-mounted device, wherein the accessory is a passive item that includes a ferrous metal or magnet.

In some aspects, the techniques described herein relate to a head-mounted device, wherein the passive item is a key and/or a keyring.

In some aspects, the techniques described herein relate to a head-mounted device, wherein the magnetometer is located in a frame arm of the head-mounted device and the volume is a hemisphere bounded on one side by a plane defined by the frame arm and not including the head of a user wearing the head-mounted device.

In some aspects, the techniques described herein relate to a head-mounted device, wherein the processor is further configured to: control an application running on the head-mounted device based on the gesture.

In some aspects, the techniques described herein relate to a head-mounted device, wherein the application controls an augmented reality interaction based on the gesture.

In some aspects, the techniques described herein relate to a head-mounted device, wherein the application controls the head-mounted device to end a power-saving mode based on the gesture.

In some aspects, the techniques described herein relate to a head-mounted device, wherein the filter is an infinite-impulse-response high-pass filter configured to separate relatively fast changes to the magnetic field caused by movement of the accessory from relatively slow changes to the magnetic field caused by ambient fluctuations.

In some aspects, the techniques described herein relate to a head-mounted device, wherein the magnetometer is one magnetometer of a plurality of magnetometers included in an inertial measurement unit (IMU) of the head-mounted device.

In some aspects, the techniques described herein relate to a head-mounted device, wherein the processor is configured to: receive a plurality of signals from each of the plurality of magnetometers; apply each of the plurality of signals to one of a plurality of filters to generate a plurality of filtered signals; apply the plurality of filtered signals to a neural network configured to generate three movement signals, each of the three movement signals corresponding to a movement in a direction along an axis of a coordinate system of the head-mounted device; integrate the three movement signals over time to compute a trajectory of the accessory in the coordinate system of the head-mounted device; and classify the trajectory as the gesture.

In some aspects, the techniques described herein relate to a method for recognizing a gesture, the method including: generating a signal corresponding to changes to a magnetic field caused by a movement of an accessory, in a passive state, in a volume including a head-mounted device, the accessory being in a passive state; applying the signal to a filter to separate relatively fast changes to the magnetic field caused by the movement of the accessory from relatively slow changes to the magnetic field caused by ambient fluctuations, the filter outputting a filtered signal; applying the filtered signal to a neural network to generate a movement signal corresponding to the movement of the accessory; and recognizing the movement as a gesture.

In some aspects, the techniques described herein relate to a method for recognizing the gesture, wherein the accessory is a wrist-worn computing device that is in the passive state.

In some aspects, the techniques described herein relate to a method for recognizing the gesture, further including: determining that the accessory is in the passive state when the wrist-worn computing device has a battery level below a threshold.

In some aspects, the techniques described herein relate to a method for recognizing the gesture, further including: controlling an application running on the head-mounted device based on the gesture.

In some aspects, the techniques described herein relate to a method for recognizing the gesture, further including: training the neural network using example signals corresponding to movements captured using a motion capture system.

In some aspects, the techniques described herein relate to an augmented reality system including: a wrist-worn computing device in a passive state; and augmented-reality glasses that include: an inertial measurement unit positioned in a frame arm of the augmented-reality glasses and configured to output signals corresponding to changes in a magnetic field as the wrist-worn computing device is moved in a volume is a hemisphere bounded on one side by a plane defined by the frame arm and not including a head of a user wearing the augmented-reality glasses; and a processor configured by instructions to: activate a passive-accessory mode for gesture input based on the passive state of the wrist-worn computing device; receive a plurality of signals from the inertial measurement unit; apply each of the plurality of signals to one of a plurality of filters to generate a plurality of filtered signals; apply the plurality of filtered signals to a neural network configured to generate three movement signals, each of the three movement signals corresponding to a movement in a direction along an axis of a coordinate system of the augmented-reality glasses; integrate the three movement signals over time to compute a trajectory of the wrist-worn computing device in the coordinate system of the augmented-reality glasses; classify the trajectory as a gesture; and control an augmented reality application based on the gesture.

In some aspects, the techniques described herein relate to an augmented reality system, wherein the processor is further configured to: receive a battery level of the wrist-worn computing device; and determine that the wrist-worn computing device is in the passive state based on the battery level.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Accessory devices (e.g., mobile phone, smart watch, wrist band, smart ring, etc.) can be configured to detect gestures that can control applications running on a head-mounted device (e.g., smart glasses). For example, a graphical user interface (i.e., GUI) displayed on smart glasses may respond (e.g., zoom) when a gesture corresponding to a thumb-index finger pinch is detected by a wristband. In another example, display of a navigation application on a mobile phone display may switch to a smart-glasses display when a gesture corresponding to pocketing the phone is detected by the mobile phone. This accessory-mediated gesture interaction may be advantageous because it can reduce a complexity and power required by smart glasses when compared to direct gesture interaction (e.g., voice interaction, pressing a button, tapping the smart glasses, etc.). The accessory-mediated gesture interaction relies on the accessory device to actively monitor position, orientation, and movement to detect a gesture. This interaction may be disrupted when the accessory device becomes electrically inactive (i.e., is in a passive state).

An accessory device may cease its active monitoring when a battery level drops below a value either because it enters a low power mode or because it stops operating all together. In this condition, gesture interaction between a head-mounted device and the accessory device may be lost, which can be confusing to a user and can limit the functionality and/or convenience of the head-mounted device.

A need exists for a way to continue gesture interaction between the head-mounted device and the accessory device when the active monitoring of the accessory device is terminated due to a low power, or no power, condition. The present disclosure solves this technical problem without significantly adding complexity (e.g., new sensors) to the head-mounted device and without significantly reducing a battery life of the head-mounted device. The disclosed techniques may have the technical effect of expanding the versatility of the head-mounted device in its ability to recognize gestures and may be used in an extended reality (e.g., augmented reality, virtual reality, mixed reality) environment. Additionally, the disclosed techniques may expand the possible accessories that can interact with the head-mounted device to magnetic and/or ferrous objects that are electrically inactive (i.e., passive).

As used herein, the term "passive state" can include any condition in which an accessory is not electrically configured for gesture recognition. For example, an accessory device can be in a passive state when it is in a mode in which it does not sense movement, orientation, or position. This mode may be set by a user or may be automatically set by a device in a condition (e.g., low power, standby, etc.). In another example, a device can be in a passive state when it is electrically active but not configured for gesture recognition. For example, a device (e.g., flashlight) that is not configured for interconnectivity with other devices (i.e., a dumb device) may be electrically active but is effectively in a passive state because it does not communicate with the head-mounted device. In another example, a device can be in a passive state when it is electrically inactive (i.e., not operating, not ON, not powered). The device may be electrically inactive as a result of being turned OFF (e.g., by a user) or because it has exhausted its power source (e.g., battery). In another example, a device can be in a passive state when it is not configured for electrical activity, such as a tool (e.g., screwdriver, wrench, etc.) or an object (e.g., key ring, permanent magnet, etc.). The term passive can be contrasted with active. In an active state an accessory may be configured to communicate with the head-mounted device and may be further configured to participate in a gesture recognition process.

Figure 1:
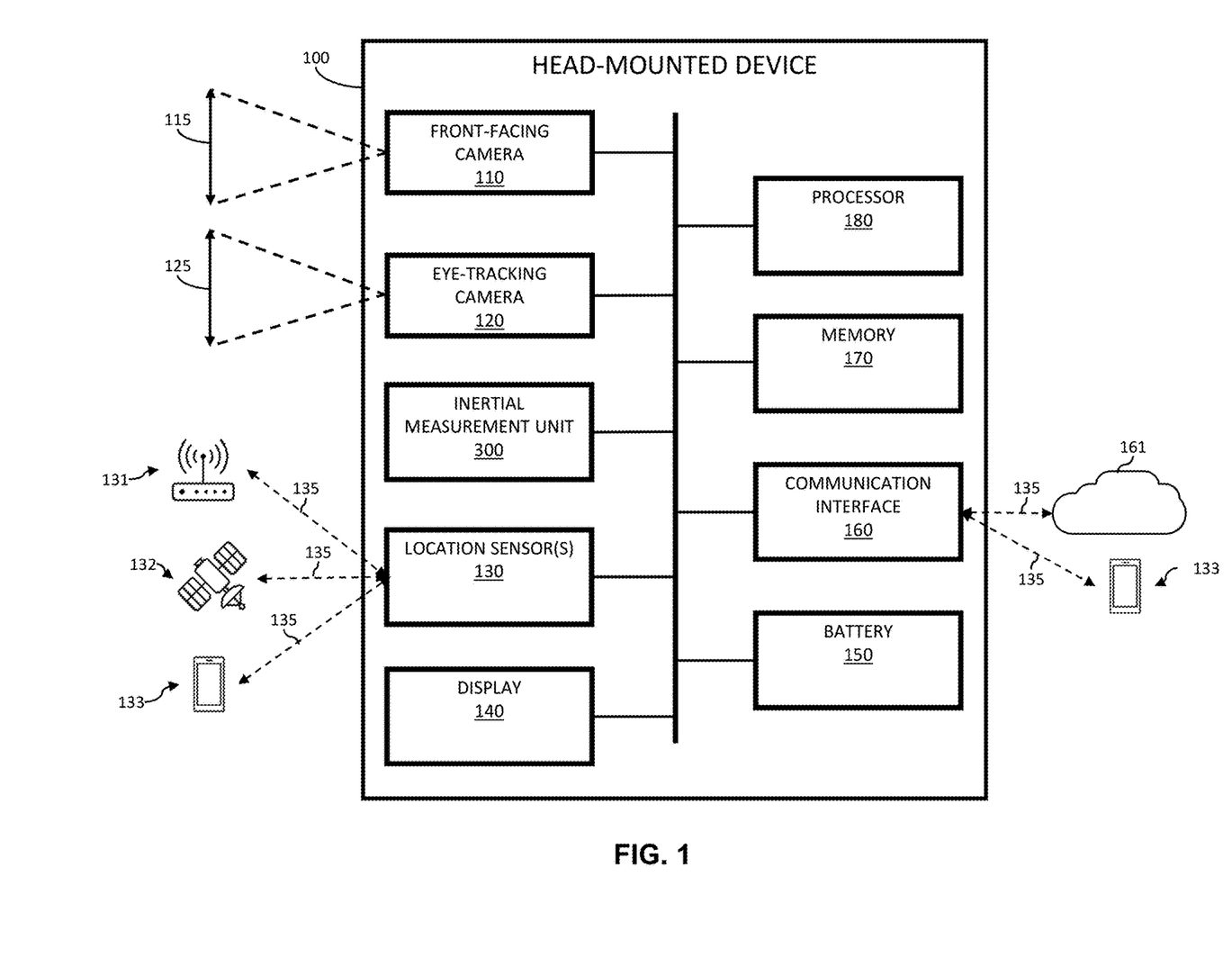
FIG. 1 is a block diagram of a head-mounted device according to a possible implementation of the present disclosure.

FIG. 1 is a block diagram of a head-mounted device according to a possible implementation of the present disclosure. The head-mounted device 100 (i.e., head-worn device) may be implemented as smart glasses worn by a user. In a possible implementation, the smart glasses may provide a user with (and enable a user to interact with) an augmented reality (AR) environment. In these implementations, the smart glasses may be referred to as AR glasses. While AR glasses are not the only possible head-mounted device that can be implemented using the disclosed systems and methods (e.g., smart earbuds), the disclosure will discuss and refer to AR glasses as the head-mounted device throughout the disclosure.

The head-mounted device 100 may be worn on the head of a user (i.e., wearer) and can be configured to monitor a position and orientation (i.e., pose) of the head of the user. Additionally, the head-mounted device 100 may be configured to monitor the environment of the user. The head-mounted device may further be configured to determine a frame coordinate system based on the pose of the user and a world coordinate system based on the environment of the user. The relationship between the frame coordinate system and the world coordinate system may be used to visually anchor digital objects to real objects in the environment. The digital objects may be displayed to a user in a heads-up display. For these functions the head-mounted device 100 may include a variety of sensors and subsystems.

The head-mounted device 100 may include a front-facing camera 110. The front facing camera may be configured to capture images of a front field-of-view 115. The front field-of-view 115 may be aligned with a user's field of view so that the front facing camera captures images from a point-of-view of the user. The camera may be a color camera based on a charge coupled device (CCD) or complementary metal oxide semiconductor (CMOS) sensor.

The head-mounted device 100 may further include an eye-tracking camera 120 (or cameras). The eye tracking camera may be configured to capture images of an eye field-of-view 125. The eye field of view 125 may be aligned with an eye of the user so that the eye-tracking camera 120 captures images of the user's eye. The eye images may be analyzed to determine a gaze direction of a user, which may be included in analysis to refine the frame coordinate system to better align with a direction in which the user is looking. When the head-mounted device 100 is implemented as smart glasses, the eye-tracking camera 120 may be integrated with a portion of a frame of the glasses surrounding a lens to directly image the eye. In a possible implementation the head-mounted device 100 includes an eye-tracking camera 120 for each eye and a gaze direction may be based on the images of both eyes.

The head-mounted device 100 may further include location sensors 130. The location sensors may be configured to determine a position of the head-mounted device (i.e., the user) on the planet, in a building (or other designated area), or relative to another device. For this, the head-mounted device 100 may communicate with other devices over a wireless communication link 135. For example, a user's position may be determined within a building based on communication between the head-mounted device 100 and a wireless router 131 or indoor positioning unit. In another example, a user's position may be determined on the planet based on a global positioning system (GPS) link between the head-mounted device 100 and a GPS satellite 132 (e.g., a plurality of GPS satellites). In another example, a user's position may be determined relative to a device (e.g., mobile phone 133) based on ultrawide band (UWB) communication or Bluetooth communication between the mobile phone 133 and the location sensors 130.

The head-mounted device 100 may further include a display 140. For example, the display 140 may be a heads-up display (i.e., HUD) displayed on a portion (e.g., the entire portion) of a lens of AR glasses. In a possible implementation, a projector positioned in a frame arm of the glasses may project light to a surface of a lens, where it is reflected to an eye of the user. In another possible implementation, the head-mounted device 100 may include a display for each eye.

The head-mounted device 100 may further include a battery 150. The battery may be configured to provide energy to the subsystems, modules, and devices of the head-mounted device 100 to enable their operation. The battery may be rechargeable and have an operating life (e.g., lifetime) between charges. The head-mounted device 100 may include circuitry or software to monitor a battery level of the battery 150.

The head-mounted device 100 may further include a communication interface 160. The communication interface may be configured to communicate information digitally over a wireless communication link (e.g., WiFi, Bluetooth, etc.). For example, the head-mounted device 100 may be communicatively coupled to a network 161 (i.e., the cloud) or a device (e.g., the mobile phone 133) over a wireless communication link 135. The wireless communication link may allow operations of a computer-implemented method to be divided between devices. Additionally, the communication link may allow a device to communicate a condition, such as a battery level or a power mode (e.g., low-power mode). In this regard, devices communicatively coupled to the head-mounted device 100 may be considered as accessories to the head-mounted device 100 and therefore each may be referred to as an accessory device. An accessory device (e.g., mobile phone 133) may be configured to detect a gesture and then communicate this detection to the head-mounted device 100 to trigger a response from the head-mounted device 100.

Figure 2:
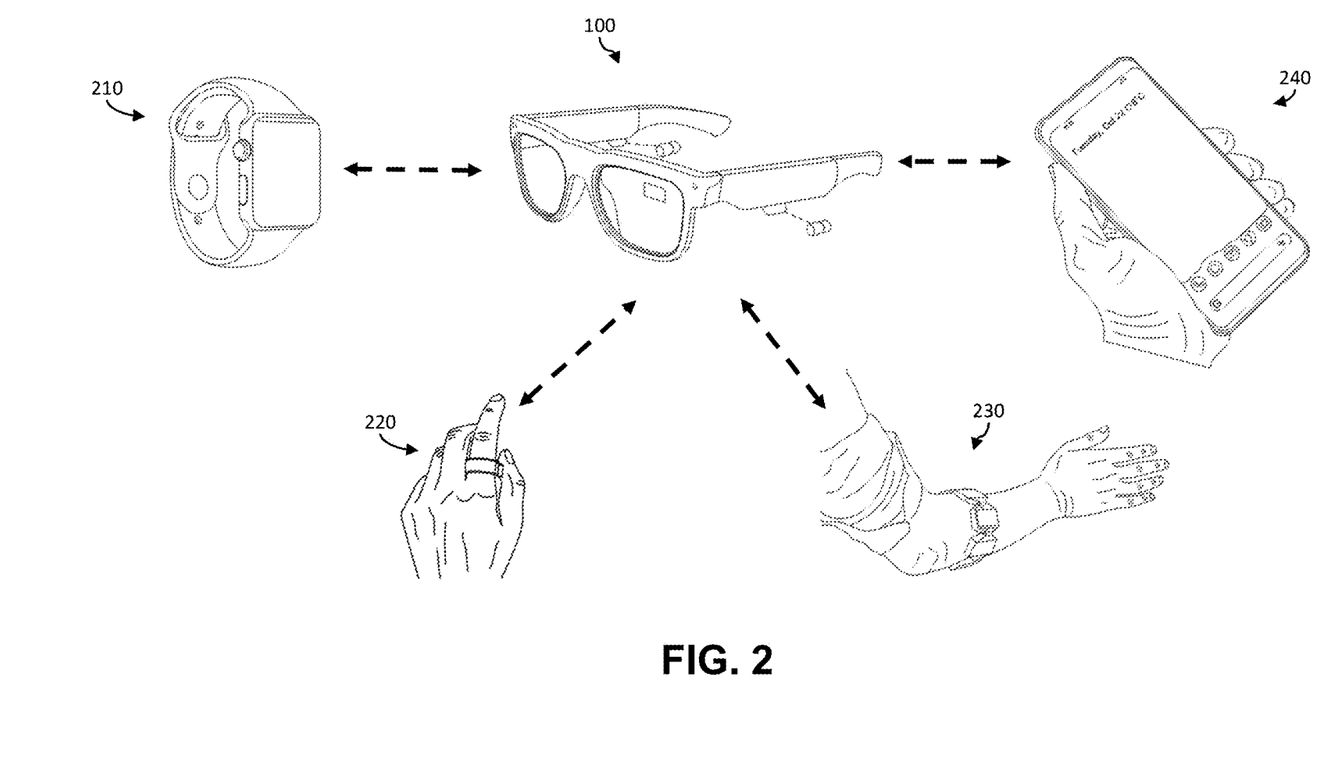
FIG. 2 illustrates possible accessory devices for a head-mounted device according to an implementation of the present disclosure.

FIG. 2 illustrates a head-mounted device 100 and possible accessory devices according to an implementation of the present disclosure. The accessory devices shown in FIG. 2 are examples and do not represent all possible accessory devices. For example, a fob, such as a car door fob, home door fob, or the like may be configured as an accessory device. As shown, the head-mounted device 100, implemented as smart glasses, can be communicatively coupled to one or more accessory devices simultaneously. A user may interact with the smart glasses using one or more of the accessory devices. For example, one or more of the accessory devices may be used to detect gestures of the user in an accessory-mediated gesture interaction. A gesture may include a movement of hand(s), arm(s), and/or finger(s) of a user.

A first possible accessory device is a smart watch 210. The smart watch 210 may be configured to be worn on a wrist of a user. The smart watch 210 may include sensors configured to detect a position, orientation, or movement of the wrist of the user as a gesture, or part of a gesture.

A second possible accessory device is a smart ring 220. The smart ring 220 may be configured to be worn on a finger of a user and may include sensors configured to detect a position, orientation, or movement of the finger as a gesture, or part of a gesture. In some implementations, the smart ring 220 can include an interface switch (e.g., button) that can be pressed (e.g., by the thumb) as part of a gesture.

A third possible accessory device is a smart armband 230. The smart armband may be worn on a wrist portion of the arm (e.g., bracelet) or on the forearm (e.g., cuff). In a possible implementation, the smart armband is implemented as a fitness-tracker. The fitness tracker can include motion sensors configured to detect a position, orientation, or movement of an upper limb (e.g., wrist, forearm) of the user. The smart armband may further include at least one sensor configured to sense muscle activity of the user's upper limb. Movement and/or activity data from one or more of these sensors may be detected as a gesture, or part of a gesture.

A fourth possible accessory device is a mobile phone 240. The mobile phone may be held in a hand of the user or otherwise carried by the user (e.g., in a pocket of the user). The mobile phone may include sensors configured to detect a position, orientation, or movement of the phone as a gesture, or part of a gesture. For example, a shake of the phone may be interpreted as a gesture.

Returning to FIG. 1, the head-mounted device 100 may further include a memory 170. The memory may be a non-transitory computer readable medium (i.e., CRM). The memory may be configured to store a computer program product. The computer program can instruct a processor to perform computer implemented methods (i.e., computer programs). These computer programs (also known as modules, programs, software, software applications or code) include machine instructions for a programmable processor and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The head-mounted device 100 may further include a processor 180. The processor may be configured to carry out instructions (e.g., software, applications, etc.) to configure the functions of the head-mounted device 100. In a possible implementation the processor may include multiple processor cores. In a possible implementation, the head-mounted computing device may include multiple processors. In a possible implementation, processing for the head-mounted computing device may be carried out over a network 161.

The head-mounted device 100 may further include an inertial measurement unit (IMU 300). The IMU may include a plurality of sensor modules to determine its position, orientation, and/or movement. The IMU may have a frame coordinate system (X,Y,Z) and each sensor module may output values relative to each direction of the frame coordinate system.

Figure 3:
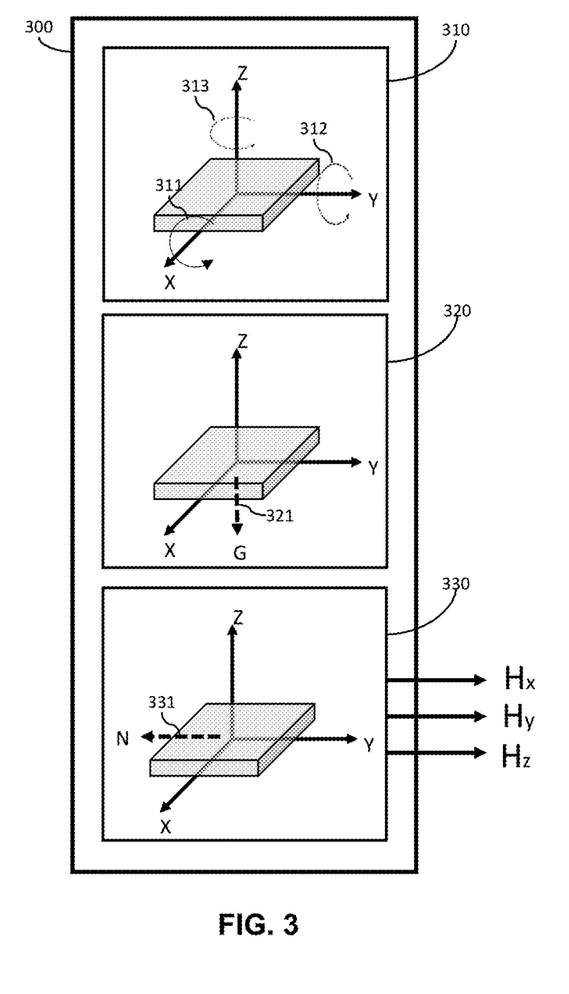
FIG. 3 is a block diagram illustrating an inertial measurement unit according to a possible implementation of the present disclosure.

FIG. 3 is a block diagram illustrating an inertial measurement unit according to a possible implementation of the present disclosure. The IMU 300 can include a gyroscope module 310 having one or more gyroscopes that are each aligned with and configured to determine a rotation (e.g., yaw 311, pitch 312, roll 313) about an axis of the frame coordinate system (X, Y, Z).

The IMU 300 can further include an accelerometer module 320 having one or more accelerometers configured to determine an orientation of the frame coordinate system relative to a down direction 321 (G) aligned with gravity.

The IMU 300 can further include a magnetometer module 330. In a possible implementation, the magnetometer module includes (i) a first magnetometer configured to measure a first magnetic field strength (i.e., $H_x$) in a first direction (i.e., X) of the frame coordinate system, (ii) a second magnetometer configured to measure a second magnetic field strength (i.e., $H_y$) in a second direction (i.e., Y) of the frame coordinate system, and (iii) a third magnetometer configured to measure a third magnetic field strength (i.e., $H_z$) in a third direction (i.e., Z) of the frame coordinate system.

The magnetometer module 330 is configured to sense a magnetic field in a user's environment (i.e., ambient magnetic field). The ambient magnetic field may include the Earth's magnetic field (i.e., magnetic north 331) plus any stray magnetic fields generated by objects (e.g., magnets, motors, etc.) in the environment. The shape (i.e., direction, strength) of the ambient magnetic field may be distorted by objects. For example, objects that can respond to a magnetic field (e.g., diamagnetic materials, paramagnetic materials) or that are magnetic (e.g., ferromagnetic materials) can change the magnetic field in an area around the object. These materials will be referred to collectively as magnetic materials. An object or an accessory that includes a magnetic material may be referred to as a magnetic object or a magnetic accessory.

In some cases, a magnetic object/accessory moving near the magnetometer can cause a distortion to the ambient magnetic field that can be detected by the magnetometer module 330 of a head-mounted device 100.

Figure 4A:
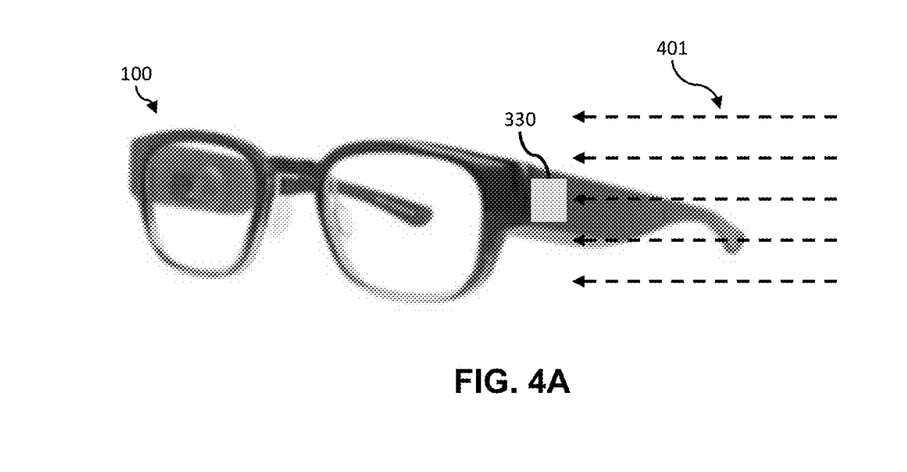
FIGS. 4A-4B illustrate a head-mounted device including sensors configured to sense an ambient magnetic field with and without distortions according to implementations of the present disclosure.

FIG. 4A illustrates a head-mounted device 100 that includes a magnetometer module 330 configured to sense an ambient magnetic field 401. The ambient magnetic field 401 is illustrated as a plurality of flux lines that correspond to the strength and direction of the magnetic field in the ambient environment. An IMU 300 including a magnetometer module 330 is located in a frame arm of the head-mounted device 100. The magnetometer module 330 is configured to sense the magnetic field 401 in a portion of the user's environment around the frame arm of the head-mounted device 100 (i.e., adjacent to the magnetometer module 330).

Figure 4B:
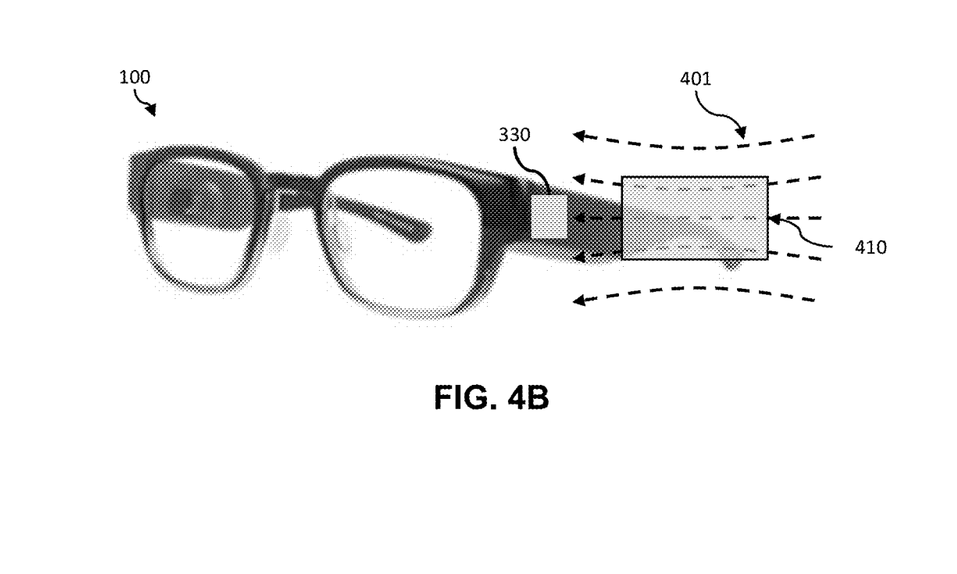

FIG. 4B illustrates a distortion to the ambient magnetic field caused by a magnetic object 410. As shown, flux lines of the ambient magnetic field are warped by the magnetic object 410 to produce a distortion that affects the strength and direction of the magnetic field. In other words, the magnetic field 401 may be changed by (i.e., distorted by) the magnetic object 410 so that a field strength may be different (e.g., greater) around the magnetic object 410 than otherwise in the ambient magnetic field. Further, a direction of the ambient field may be different around the magnetic object 410 than otherwise in the ambient magnetic field. Because the magnetometer module 330 is configured to sense magnetic field strength and direction, the distortion caused by the magnetic object 410 can be detected when the distortion is within a detectable range of the magnetometer module 330. A detectable range of the magnetometer module 330 may be based on (i) a sensitivity of the magnetometers in the magnetometer module 330, (ii) a size of the distortion, and (iii) the relative positions of the magnetic object 410 and the magnetometer module 330.

Figure 5:
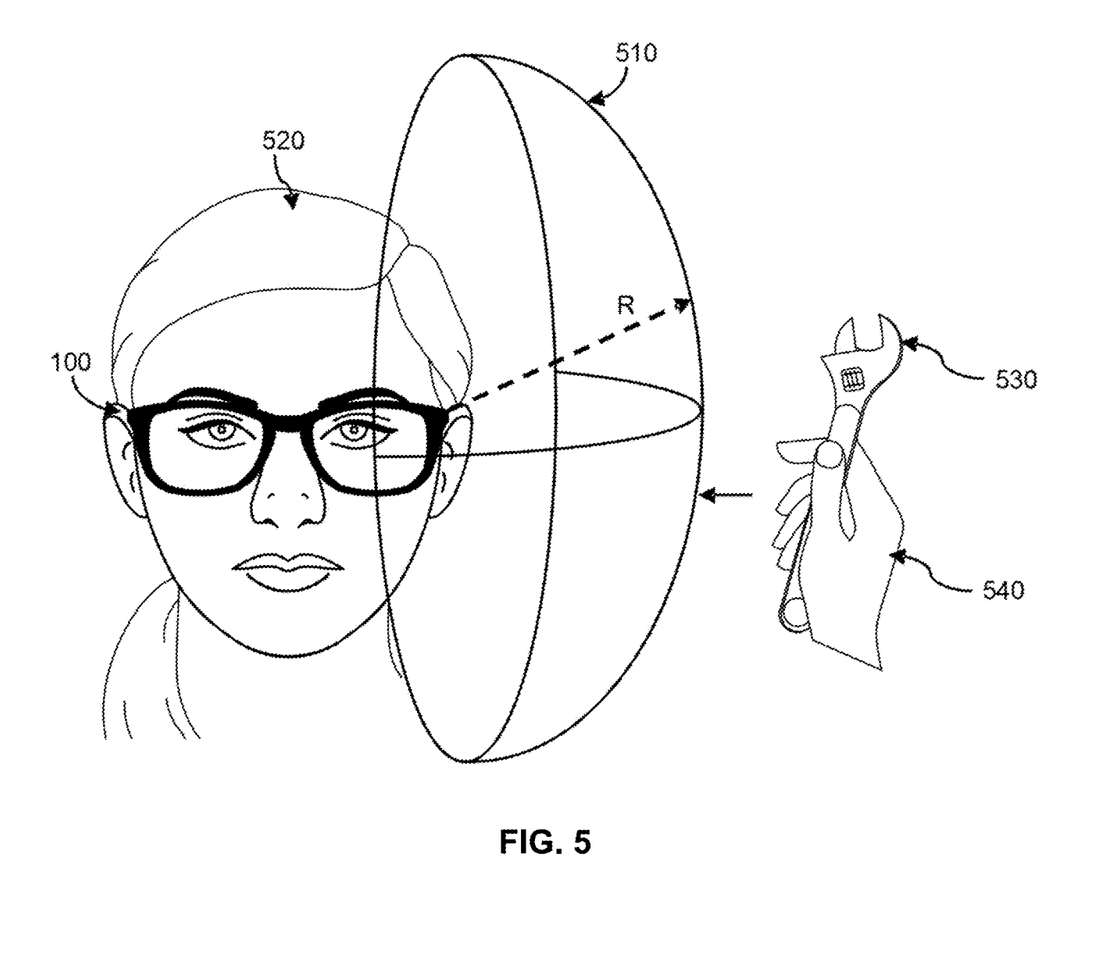
FIG. 5 illustrates a possible volume of detection for a head-mounted device according to a possible implementation of the present disclosure.

FIG. 5 illustrates a possible volume of detection (i.e., a sensitivity pattern) for a magnetometer module 330 located in a frame arm of a head-mounted device 100. The volume 510 can be a hemisphere defined by a radius (i.e., R), which can be the detectable range of the magnetometer. The volume is presented to help understand the interactions between magnetic objects/accessories. In practice, variations may exist. For example, a response (i.e., range) may not be defined by a single radius and the boundaries may be less distinct. Accordingly, a volume of detection is not limited to that shown and may be different in different ambient environments.

The volume 510 can be bounded on a side (i.e., a flat side) by a plane defined by the frame arm. In other words, the volume 510 can be a hemisphere having an origin located at the magnetometer and having a radius directed towards the environment (i.e., away from the head 520 of the user) so that the volume 510 does not include the head of the user wearing the head-mounted device 100.

When a magnetic object 530, which is shown in FIG. 5 as a steel wrench but which could be any magnetic object, is moved into the volume 510, it may be detected by the magnetometer module 330 of the head-mounted device 100. Additionally, the movement of the magnetic object 530 can be tracked over time when the magnetometer module 330 is configured to track the magnetic field in multiple dimensions (e.g., three-dimensions).

One advantage of the present approach is that any object that causes a change to the magnetic field sensed by the IMU can be used for gesturing. While passive devices have been discussed, active devices may be used as well. For example, an active device may be a mobile phone that is powered (but not actively monitoring gestures) or an electric motor that generates stray magnetic fields.

The magnetic object 530 may be moved by a hand 540 of the user in a particular way to perform a gesture. For example, a gesture may include positioning the magnetic object 530 inside the volume 510 so that it can be detected and then moving the magnetic object 530 to perform a movement corresponding to the gesture. The user may know the movement corresponding to the gesture (e.g., by training) or may be informed how to perform the gesture as part of an interaction. Various movements may be recognized as various gestures.

Figure 6:
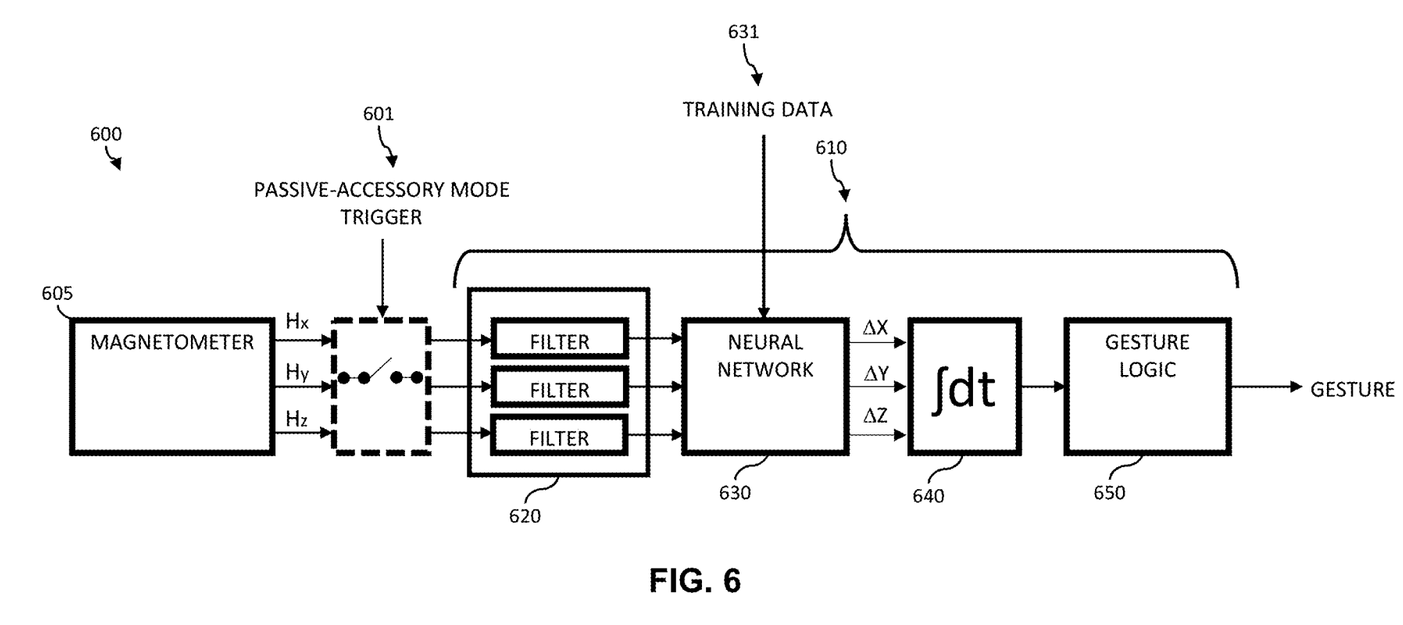
FIG. 6 is a block diagram of a process for gesture recognition using a head-mounted device according to a possible implementation of the present disclosure.

FIG. 6 is a block diagram of a framework for passive-accessory mediated gesture recognition with a head-mounted device according to a possible implementation of the present disclosure. The framework 600 may include receiving a trigger signal 601 to enter a passive-accessory mode. In the passive-accessory mode, the head-mounted device may be configured to monitor the magnetometer of the IMU for possible gestures. In other words, the trigger signal 601 may (i) activate a passive-accessory mediated gesture recognition algorithm 610 to run on the head-mounted device and (ii) couple signals from the magnetometer 605 of the head-mounted device to the passive-accessory mediated gesture recognition algorithm 610 running on the head-mounted device. The passive-accessory mediated gesture recognition algorithm 610 is configured to sense changes (e.g., distortions) to the magnetic fields (Hx, Hy, Hz) caused by an accessory device (e.g., smartphone, bands, metal rings, keychains, etc.) moving in a volume on a world-facing side of the magnetometer 605 in the head-mounted device.

The trigger signal may be initiated in a variety of ways. For example, a user may initiate the passive-accessory mode (e.g., through a gesture). As another example, the passive accessory mode may be initiated automatically. For example, an accessory device (e.g., smart watch) may interact with the head-mounted device to communicate its power status (e.g., power saving mode). In a possible implementation, the head-mounted device monitors a battery level (i.e., power level) of the accessory device and triggers the passive accessory mode when the battery level satisfies a criterion (e.g., drops below a threshold). The head-mounted device may communicate when it enters the passive-accessory mode to a user. This may help the user interact with the device, especially if the user is required to change gesturing in the passive-accessory mode.

The passive-accessory mediated gesture recognition algorithm 610 includes a filtering module 620. The filtering module is configured to receive one or more channels from the magnetometer. Each channel may include a time varying signal corresponding to an axis of the magnetometer. The filtering module may include a filter for each channel. The channel filters may be identical or different and may be configured to separate magnetic fluctuations caused by human movement from fluctuations caused by changes to the ambient environment. The separation may be based on the expected speed (i.e., frequency) of each type of fluctuation. For example, fluctuations due to hand, wrist, or finger movements may be faster than fluctuations due to the change in magnetic north due to a head movement. Accordingly, the channel filters of the filtering module 620 may be high-pass filters configured to attenuate (e.g., suppress) fluctuations below a cutoff frequency. The cutoff frequency may be set based on a frequency analysis of possible ambient fluctuations. For example, the cutoff frequency may be set so that 95% of ambient fluctuations are removed from the magnetic field signals. In a possible implementation the signals from the magnetometer are time-based samples of the magnetic field in three dimensions and the filter for each dimension is an infinite-impulse response (IIR) high-pass filter.

The filtered signals may then be applied to a neural network 630. The neural network 630 can be trained prior to operation (i.e., offline) with training data 631. The training data 631 may be obtained from gestures recorded using a motion capture system. For example, the motion capture system can record hand/head poses of a plurality of participants (e.g., >100) as they form gestures.

The neural network 630 may be implemented as a convolutional neural network with long short-term memory (CNN-LSTM). In a possible implementation, the filtered signals are concatenated and passed to a convolutional layer that is appended with an LSTM model for time-series correlation modeling. The output of the neural network 630 may include nodes (e.g., three nodes) that each describes a change in movement along an axis of the magnetometer. For example, the neural network 630 can output a change in movement along the X-axis (i.e., $\Delta x$), a change in movement along the Y-axis (i.e., $\Delta y$), and a change in movement along the Z-axis (i.e., $\Delta z$). The change in movement (i.e., delta movement) does not need to include absolute positions only how much has changed. Accordingly, the output of the neural network 630 may be a trajectory.

A movement of a passive accessory may be characterized by a trajectory, which is the delta movement over a period of time. Accordingly, the passive-accessory mediated gesture recognition algorithm 610 further includes an integrator module (i.e., integrator 640) configured to integrate the delta movements over time to compute a trajectory (e.g., in relative coordinates).

The passive-accessory mediated gesture recognition algorithm 610 further includes gesture logic 650 configured to map a trajectory with a gesture. In other words, the gesture logic may be implemented as a model (e.g., library) of possible gestures/trajectories that is configured to output a particular gesture when a measured trajectory maps to a stored gesture/trajectory with a confidence that satisfies a criterion (e.g., is above a threshold).

Figure 7:
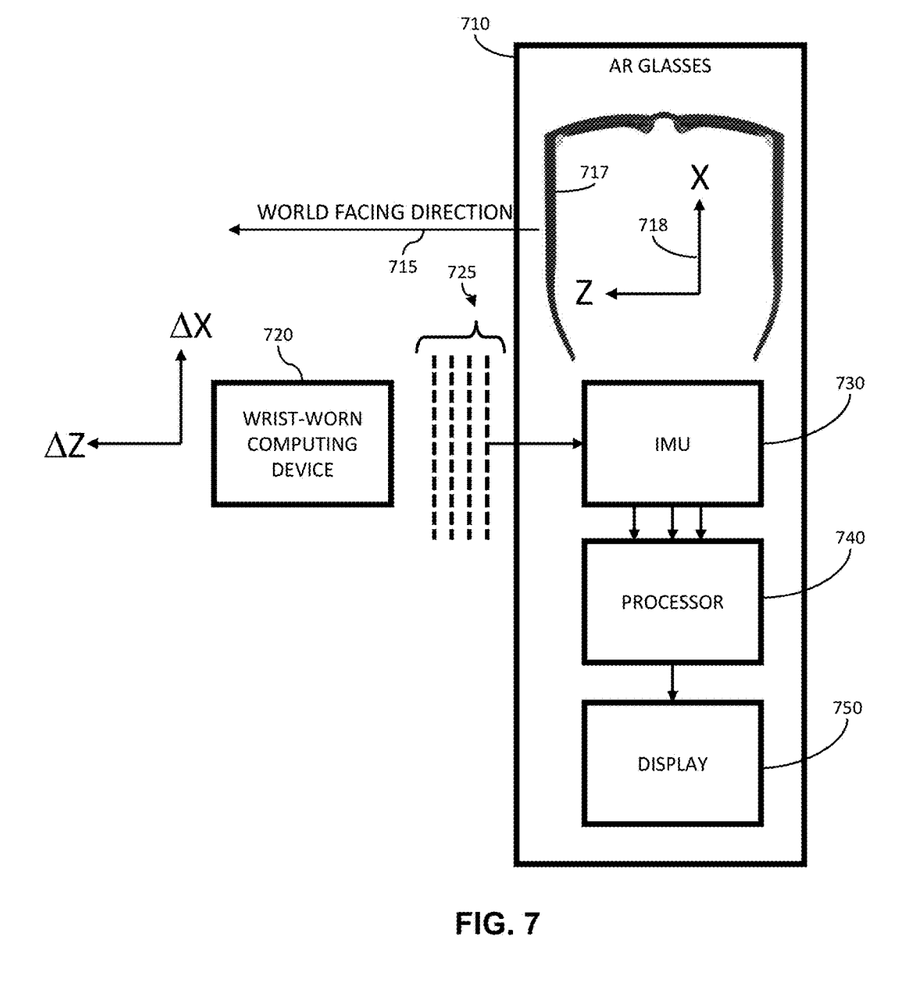
FIG. 7 is a block diagram illustrating a gesture interaction between a head-mounted device and an accessory device according to a possible implementation of the present disclosure.

FIG. 7 is a block diagram illustrating a gesture interaction between a head-mounted device and an accessory device according to a possible implementation of the present disclosure. As shown, the head-mounted device is implemented as AR glasses 710, while the accessory device is implemented as a wrist-worn computing device 720 (e.g., smart watch).

The wrist-worn computing device 720 may trigger the AR glasses 710 to monitor a magnetic field 725 for gestures when the wrist-worn computing device is in (e.g., enters) a passive state. The AR glasses may be configured to monitor the magnetic field 725 in a world-facing direction 715 using an IMU 730 positioned in a frame arm 717 of the AR glasses 710. The world-facing direction 715 may be normal to a plane defined by the frame arm 717 of the AR glasses 710.

A magnetometer in the IMU 730 may define a frame coordinate system 718 in which an X-dimension is aligned with the frame arm 717 of the AR glasses 710 and a Z-dimension (Z) is orthogonal to the frame arm 717 of the AR glasses 710. The wrist-worn computing device 720 in the passive state may operate as a magnetic object that can distort the magnetic field 725 when moved in a change direction along the X-dimension, Y-dimension, and/or Z-dimension. A processor 740 may receive the sensed fields and may be configured to perform the steps of the passive-accessory mediated gesture recognition algorithm 610, as shown in FIG. 6. A detected gesture may configure the processor to control an AR application. For example, a user interface on a display 750 of the AR glasses 710 may be updated and/or changed based on the gesture.

In a possible implementation, when the change movement ($\Delta x$) in the X-dimension is positive 10 cm while the change movements in the other directions ($\Delta y$, $\Delta z$) are roughly constant, then a "left swipe" gesture may be determined and can trigger the head-mounted device to respond (e.g., in a user interface). Similarly, when the change movement ($\Delta x$) in the X-dimension is negative 10 cm while the change movements in the other directions ($\Delta y$, $\Delta z$) are roughly constant, then a "right swipe" gesture may be determined. In other words, the direction of a movement of the wrist wearing the passive accessory may be detected.

In another possible implementation, when the change movement ($\Delta z$) in the Z-dimension is less than 5 cm, then a "wake-up" gesture may be determined, and a display of the head-mounted device may be activated. The "wake-up" gesture can anticipate a user's hand coming into the front field of view 115 and proactively wake-up the user interface for augmented reality interaction. The Z-dimension (i.e., Z-axis) may be aligned with a direction that is perpendicular to the frames.

Figure 8:
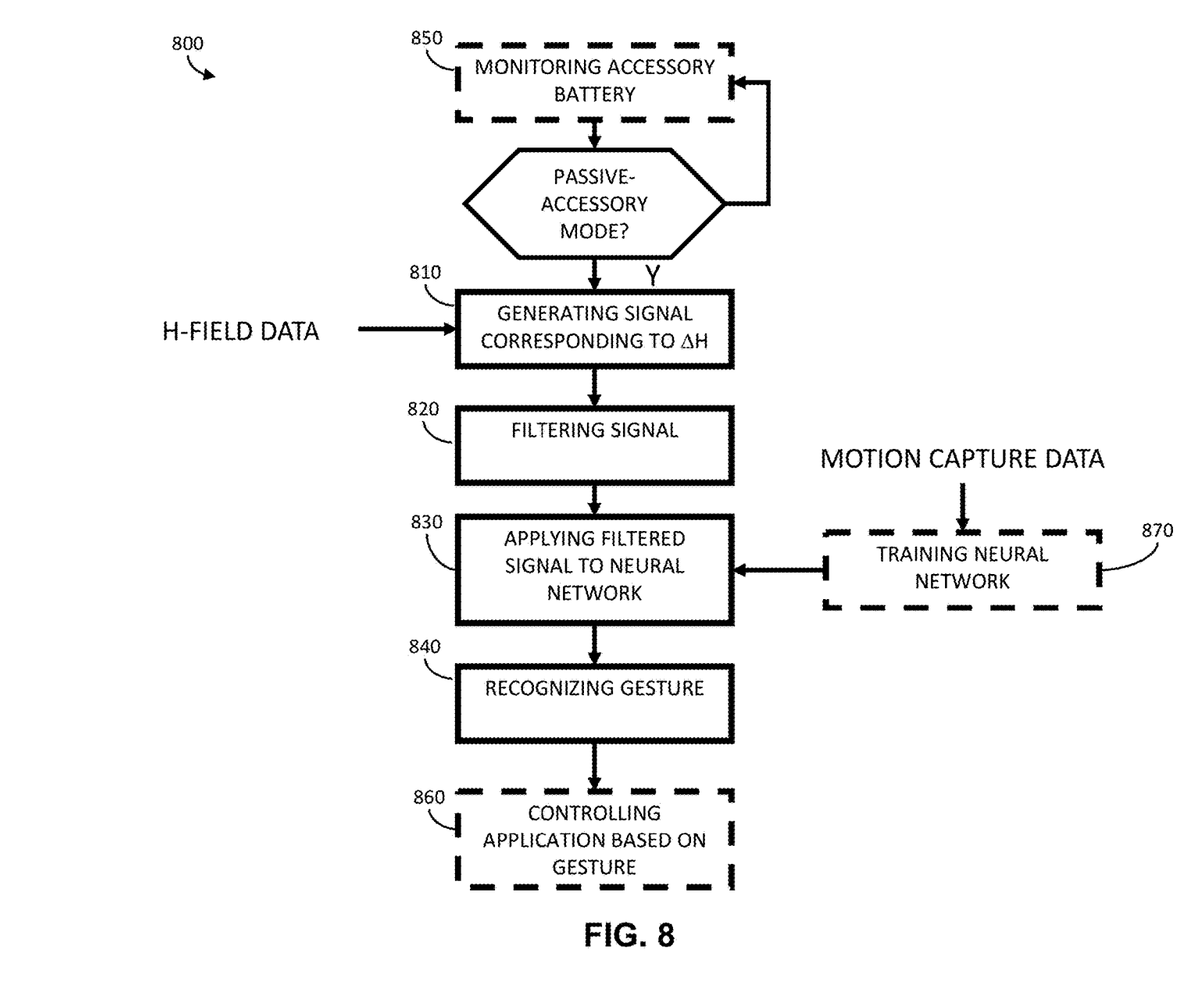
FIG. 8 is a flowchart of a method for recognizing a gesture according to a possible implementation of the present disclosure.

FIG. 8 is a flowchart of a method for recognizing a gesture according to a possible implementation of the present disclosure. The method 800 includes generating 810 at least one signal corresponding to changes to a magnetic field (i.e., $\Delta H$). The changes to the magnetic field can be caused by a movement of an accessory (e.g., an accessory in a passive state) in a volume including a head-mounted device. The method 800 further includes filtering 820 the signal (or signals) to separate relatively fast changes to the magnetic field (i.e., high-frequency signals) caused by the movement of the accessory from relatively slow changes to the magnetic field (i.e., low-frequency signals) caused by ambient fluctuations to generate a filtered signal. For example, the low-frequency components can be attenuated (or eliminated) from the filtered signal. The method 800 further includes applying 830 the filtered signal to a neural network to generate a movement signal corresponding to the movement of the accessory. The movement may be relative to a frame coordinate system of the head-mounted device. The method further includes recognizing 840 the movement signal as a gesture. In a possible implementation, the method 800 further includes controlling 860 an application running on the head-mounted device based on the gesture.

In a possible implementation, the method 800 can include triggering a passive accessory mode for gesture recognition based on a battery level of an accessory. For example, the method can include monitoring 850 a battery of an accessory device (i.e., a power level of the accessory device) and triggering the passive accessory mode, in which H-field data is used to recognized gestures, when a battery level drops below a level (e.g., is zero).

In a possible implementation, the method 800 can include training 870 the neural network. The neural network may be trained before use. The training may include gathering motion capture data corresponding to movements of participants performing gestures captured by a motion capture system.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

What is claimed is:

1. A head-mounted device comprising:
   a magnetometer configured to detect changes to a magnetic field in a volume including the head-mounted device; and
   a processor configured by instructions to:
      receive a trigger signal from a wrist-worn computing device, the trigger signal indicating that a battery level of the wrist-worn computing device is below a threshold;
      activate a passive-accessory mode for gesture input in response to the trigger signal;
      receive a signal from the magnetometer corresponding to the changes to the magnetic field caused by movement of an accessory in the volume including the head-mounted device;
      apply the signal to a filter to generate a filtered signal;
      apply the filtered signal to a neural network to generate a movement signal corresponding to the movement of the accessory; and
      classify the movement signal as a gesture.

2. The head-mounted device according to claim 1, wherein the accessory is the wrist-worn computing device.

3. The head-mounted device according to claim 2, wherein the trigger signal is received from a mobile phone monitoring the battery level of the wrist-worn computing device.

4. The head-mounted device according to claim 2, wherein the processor is configured to:
   receive the trigger signal to activate the passive-accessory mode for gesture input when the wrist-worn computing device is turned OFF.

5. The head-mounted device according to claim 1, wherein the accessory is a passive item that includes a ferrous metal or magnet.

6. The head-mounted device according to claim 5, wherein the passive item is a key and/or a keyring.

7. The head-mounted device according to claim 1, wherein the magnetometer is located in a frame arm of the head-mounted device and the volume is a hemisphere bounded on one side by a plane defined by the frame arm and not including the head of a user wearing the head-mounted device.

8. The head-mounted device according to claim 1, wherein the processor is further configured to:
   control an application running on the head-mounted device based on the gesture.

9. The head-mounted device according to claim 8, wherein the application controls an augmented reality interaction based on the gesture.

10. The head-mounted device according to claim 8, wherein the application controls the head-mounted device to end a power-saving mode based on the gesture.

11. The head-mounted device according to claim 1, wherein the filter is an infinite-impulse-response high-pass filter configured to separate relatively fast changes to the magnetic field caused by movement of the accessory from relatively slow changes to the magnetic field caused by ambient fluctuations.

12. The head-mounted device according to claim 1, wherein the magnetometer is one magnetometer of a plurality of magnetometers included in an inertial measurement unit (IMU) of the head-mounted device.

13. The head-mounted device according to claim 12, wherein the processor is configured to:
   receive a plurality of signals from each of the plurality of magnetometers;
   apply each of the plurality of signals to one of a plurality of filters to generate a plurality of filtered signals;
   apply the plurality of filtered signals to the neural network configured to generate three movement signals, each of the three movement signals corresponding to a movement in a direction along an axis of a coordinate system of the head-mounted device;
   integrate the three movement signals over time to compute a trajectory of the accessory in the coordinate system of the head-mounted device; and
   classify the trajectory as the gesture.

14. A method for recognizing a gesture, the method comprising:
   receiving a trigger signal at a head-mounted device from a wrist-worn computing device, the trigger signal indicating that a battery level of the wrist-worn computing device is below a threshold;
   activating a passive-accessory mode for gesture input in response to the trigger signal;
   generating a signal corresponding to changes to a magnetic field caused by a movement of an accessory in a volume including the head-mounted device;
   filtering the signal to separate relatively fast changes to the magnetic field caused by the movement of the accessory from relatively slow changes to the magnetic field caused by ambient fluctuations to generate a filtered signal;
   applying the filtered signal to a neural network to generate a movement signal corresponding to the movement of the accessory; and
   recognizing the movement signal as the gesture.

15. The method for recognizing the gesture according to claim 14, wherein the accessory is the wrist-worn computing device.

16. The method for recognizing the gesture according to claim 14, further comprising:
controlling an application running on the head-mounted device based on the gesture.

17. The method for recognizing the gesture according to claim 14, further comprising:
training the neural network using example signals corresponding to movements captured using a motion capture system.

18. An augmented reality system comprising;
a wrist-worn computing device in a passive state; and
augmented-reality glasses that include:
an inertial measurement unit positioned in a frame arm of the augmented-reality glasses and configured to output signals corresponding to changes in a magnetic field as the wrist-worn computing device is moved in a volume is a hemisphere bounded on one side by a plane defined by the frame arm and not including a head of a user wearing the augmented-reality glasses; and
a processor configured by instructions to:
receive a battery level of the wrist-worn computing device;
determine that the wrist-worn computing device is in the passive state based on the battery level;
activate a passive-accessory mode for gesture input based on the passive state of the wrist-worn computing device;
receive a plurality of signals from the inertial measurement unit;
apply each of the plurality of signals to one of a plurality of filters to generate a plurality of filtered signals;
apply the plurality of filtered signals to a neural network configured to generate three movement signals, each of the three movement signals corresponding to a movement in a direction along an axis of a coordinate system of the augmented-reality glasses;
integrate the three movement signals over time to compute a trajectory of the wrist-worn computing device in the coordinate system of the augmented-reality glasses;
classify the trajectory as a gesture; and
control an augmented reality application based on the gesture.

* * * * *